3,410,879
PROCESS FOR PREPARING GONAHEXAENES
Herchel Smith, Wayne, Gordon Alan Hughes, Haverford, and Robert Conrad Smith, Jr., King of Prussia, Pa., assignors to American Home Products Corporation, New York, N.Y., a corporation of Delaware
No Drawing. Continuation-in-part of application Ser. No. 544,682, Apr. 25, 1966. This application Apr. 12, 1967, Ser. No. 630,212
5 Claims. (Cl. 260—397.45)

ABSTRACT OF THE DISCLOSURE

This invention is concerned with a process of preparing gona - 1,3,5(10),6,8,14 - hexaene by contacting a gona - 1,3,5(10),8,14 - pentaene with an oxidizing catalyst in a reaction-inert solvent in the presence of a hydrogen acceptor at a temperature range of about 100° C. to about 180° C. for a period of about a half hour to about twenty hours. The gona - 1,3,5(10),6,8,14 - hexaenes prepared by the process of this invention are useful in the preparation of gona - 1,3,5(10),6,8 - pentaene steroids which are useful as estrogenic agents.

---

This application is a continuation-in-part of copending U.S. patent application, Ser. No. 544,682, filed on Apr. 25, 1966, entitled, "Process for Preparing Gona-hexaenones" which has now been abandoned.

This invention relates to a new and novel process for preparing gonahexaenes. In particular, the present invention is concerned with a method for synthesizing gona-1,3,5(10),6,8,14-hexaenes.

The novel process of this invention is utilized to prepare compounds which are representatively depicted by the following formula:

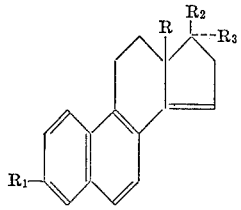

wherein R is lower alkyl; $R_1$ is selected from the group consisting of hydrogen, lower alkoxy and lower alkanoyloxy; $R_2$ is selected from the group consisting of hydrogen, hydroxy, lower alkoxy, lower alkanoyloxy; $R_3$ is selected from the group consisting of hydrogen and lower alkonoyloxy with the proviso that at least one of $R_2$ and $R_3$ is hydrogen; and when $R_2$ and $R_3$ are taken together they are selected from the group consisting of oxo and ethylenedioxy.

Typical examples of these compounds include: 13β-ethyl - 3 - methoxygona - 1,3,5(10),6,8,14 - hexaen - 17-one; 3 - methoxy - 13β - propyl - gona - 1,3,5(10),6,8,14-hexaen - 17 - one; 3 - acetoxy - 13β - methylgona - 1,3,5(10),6,8,14 - hexaen - 17 - one; 13β - methyl - 3-methoxygona - 1,3,5(10),6,8,14 - hexaen - 17β - ol and 17β - acetoxy - 13β - ethyl - 3 - methoxygona - 1,3,5(10),6,8,14 - hexaene.

The new and novel process of the present invention comprises the preparation of gona - 1,3,5(10),6,8,14-hexaenes by the selective catalytic dehydrogenation of the 6-position of gona-1,3,5(10),8,14-pentaenes.

The following reaction scheme illustrates this novel process:

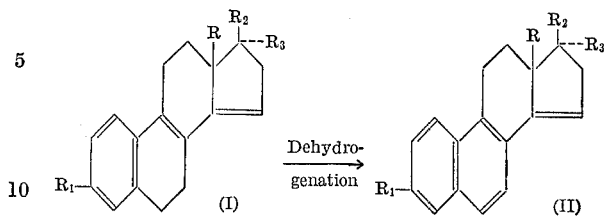

wherein R, $R_1$, $R_2$ and $R_3$ are defined as above; the dehydrogenation reaction is effected by heating an appropriate gona - 1,3,5(10),8,14 - pentaen - 17 - one (I) in a reaction inert solvent, in the presence of an oxidizing catalyst and a hydrogen acceptor, at a temperature range from about 100° C. to about 180° C. for a period of from about one-half hour to about thirty hours. Preferably, this reaction is conducted in p-isopropyl-toluene, in the presence of palladized charcoal and methyl cinnamate, at reflux temperatures for about one hour. After the selective dehydrogenetion reaction is complete, the resulting gona - 1,3,5(10),6,8,14 - hexaene is obtained by conventional methods such as, filtration, concentration and crystallization.

The gona - 1,3,5(10),8,14 - pentaene (I) starting materials utilized in the process of the present invention are known compounds which are described or prepared by prior art procedures. The gona - 1,3,5(10),8,14-pentaene starting materials, with the exception of the 17α-lower alkanoyloxygona - 1,3,5(10),8,14 - pentaenes, may be prepared by the procedure described by Smith et al. in J.C.S., pp. 4472–4492 (1964) and by Hughes et al, in U.S. 3,202,686, issued on August 24, 1965, entitled "Preparation of 13 - alkylgona - 1,3,5(10),8,14 - pentaenes." The 17α - lower alkanoyloxygona - 1,3,5(10), 8,14 - pentaenes may be prepared by the procedure described by Gibian et al. in Tetrahedron Letters No. 21, p. 2321 (1966). By reaction-inert solvent as employed herein is meant a solvent which dissolves the reactants and does not prevent their interaction, such as, xylene, toluene, p - isopropyl - toluene, diethyleneglycol dimethylether and diethyleneglycol diethylether. The term "oxidizing catalyst" as employed above includes among others palladized charcoal and metallic platinum black. Further, the expression "hydrogen acceptor" refers to unsaturated organic compounds which are easily reduced by the addition of hydrogen, e.g. methyl cinnamate, diethyl maleate, ethyl acrylate and acetylene dicarboxylic acid dimethyl ester.

The gona-1,3,5(10),6,8,14-hexaenes (II) prepared by the process of this invention are useful intermediates in the preparation of gona-1,3,5(10),6,8-pentaene steroids which are useful as estrogenic agents. The process of hydrogenating the gona-1,3,5(10),6,8,14-hexaen-17-ones (II), which may be prepared by the process of this invention to obtain the corresponding gona-1,3,5(10),)6,3-pentaen-17-ones and, if desired, the subsequent hydrolysis of a 3-position lower alkoxy or lower alkanoyloxy group to yield an appropriate 3-hydroxygona-1,3,5(10),6,8-pentaen-17-one is described by Johnson, W. S., et. al. in J.A.C.S. 69, 2942-2955 (1947).

It will be apparent from the disclosure herein to those skilled in the art that for the purposes of this invention, certain atoms of the benzenoid portion of the starting compounds could be otherwise substituted or be substistituted with groups which do not interfere with the subsequent reactions. Thus, at the 1, 2 or 4 positions, an alkyl (e.g. methyl and propyl), an alkoxy (e.g. methoxy and butoxy), or a halogen (e.g. chloro and bromo) groups could be present in lieu of hydrogen. When the starting compounds are substituted as hereinbefore recited, it will be apparent to those skilled in the art of chemistry that the compounds prepared by the process of this invention will bear correspondingly the same substituents. Thus, for the process of this invention and for the products produced thereby, such groups are the full equivalents of the claimed invention.

While the compounds of this invention are named to describe the configuration corresponding to that of natural steroids, it is to be understood that unless otherwise indicated, the product of each of the reactions is a racemic mixture containing the named compound and its enantiomorph.

The following examples are given by way of illustration and are not to be construed as limitations of this invention, many variations of which are possible without departing from the scope and spirit thereof.

Example I

A mixture of 13β-ethyl-3-methoxygona-1,3,5(10),8,14-pentaen-17-one (20 g.), 5% palladium on charcoal (20 g.), p-isopropyl-toluene (520 ml.) and methyl cinnamate (33 g.) is refluxed in a nitrogen stream for one hour. After filtration and removal of volatile organics by vacuum distillation, a red gum is obtained which crystallizes upon scratching with cold methanol. Recrystallization from acetone yields 13β-ethyl-3-methoxygona-1,3,5(10),6,8,14-hexaen-17-one (7.7 g.), M.P. 145–150° C.;

$\lambda_{max.}^{EtOH}$ 254μ (ϵ=49,300), 262 (49,900), 295 (15,210), 306 (14,000), 332 (1,520), 349 (910)

Example II

Hydrogenation of the above prepared 13β-ethyl-3-methoxygona-1,3,5(10),6,8,14-hexaen-17-one (3.0 g.) is accomplished using 5% palladium on charcoal (3 g.) in ethyl acetate (500 ml.) to yield 13β-ethyl-3-methoxygona-1,3,5(10),6,8-pentaen-17-one, (1.56 g.), M.P. 175–179° C.

This methyl ether (1.56 g.) is cleaved using acetic acid (97 ml.), hydrochloric acid (45 ml.) and water (11 ml.) and refluxing the mixture in a nitrogen atmosphere for seventeen hours. A crystalline product separates from the reaction mixture which upon recrystallization from acetone-methanol yields 13β-ethyl-3-hydroxygona - 1,3,5 (10),6,8-pentaen-17-one (1.17 g.), M.P. 254–258° C.;

$\lambda_{max.}^{EtOH}$ 232 mμ (ϵ=62,300), 272 (4,450), 283 (5,000), 294 (3,700), 332 (1,600), 343 (2,100)

Calculated for $C_{19}H_{20}O_2$: C, 81.39; H, 7.19. Found: C, 81.52; H, 6.92.

Example III

A mixture of 3-methoxy-13β-methylgona-1,3,5(10),8,14-pentaen-17-one (10 g.), 5% palladium on charcoal (10 g.), p-isopropyl-toluene (250 ml.) and methyl cinnamate (16.5 g.) is heated to 150° C. under nitrogen for two hours. After filtration and removal of volatile organics by vacuum distillation, the residue is crystallized from methanol. Recrystallization from methanol yields 3-methoxy-13β-methylgona - 1,3,5(10),6,8,14 - hexaen-17-one.

The above prepared 3-methoxy-13β-methylgona-1,3,5 (10),6,8,14-hexaen-17-one is hydrogenated in the presence of 10% palladium charcoal in ethyl acetate to obtain 3-methoxy-13β-methylgona-1,3,5(10),6,8-pentaen-17-one, M.P. 181–184° C., $\lambda_{max.}^{EtOH}$ 231 mμ (ϵ=53,700), 268 (4,570), 278 (5,700), 289 (4,700), 322 (4,000)

This compound is then refluxed with acetic acid and hydrochloric acid, under nitrogen, for twenty hours to yield 3-hydroxy-13β-methylgona - 1,3,5(10),6,8-pentaen-17-one, M.P. 274–275° C.;

$\lambda_{max.}^{EtOH}$ 231 mμ (ϵ=62,900), 270 (2,300), 281 (2,660), 292 (1,800), 327 (1,100), 341 (1,200)

Calculated for $C_{18}H_{18}O_2$: C, 81.17; H, 6.81. Found: C, 80.92; H, 6.56.

Example IV

A mixture of 3-butoxy-13β-methylgona-1,3,5(10),8,14-pentaen-17-one (5 g.), 2% palladium on charcoal (12.5 g.), diethyleneglycol dimethylether (150 ml.) and ethyl acrylate (10 g.) is heated to reflux under nitrogen for ten hours. After filtration and removal of volatile organics by vacuum distillation, the residue is crystallized from propanol. Recrystallization from methanol yields 3-butoxy-13β-methylgona-1,3,5(10),6,8,14-hexaen-17-one.

Example V

A mixture of 3-hydroxy-13β-methylgona-1,3,5(10),8,14-pentaen-17-one (10 g.), 30% palladium on charcoal (1.7 g.), ethyl acrylate (20 g.) and toluene (260 ml.) is heated to 100° C. under helium for twenty hours. After filtration and removal of volatile organics by vacuum distillation, the residue is crystallized from ethanol. Recrystallization from methanol yields 3-hydroxy-13β-methylgona-1,3,5(10),6,8,14-hexaen-17-one.

In the same manner, 3-ethoxy-13β-ethylgona-1,3,5(10), 8,14-pentaen-17-one is admixed with 20% palladium on charcoal and diethyl maleate in xylene to produce 3-ethoxy-13β-ethylgona-1,3,5(10),6,8,14-hexaen-17-one.

Example VI

A mixture of 3-methoxy-13β-propylgona-1,3,5(10),8, 14-pentaen-17-one (40 g.), 5% palladium on charcoal (40 g.), p-isopropyl-toluene (1,000 ml.) and methyl cinnamate (65 g.) is heated to 125° C. under nitrogen for three hours. After filtration and removal of volatile organics by vacuum distillation, the residue is crystallized from methanol. Recrystallization from acetone yields 3-methoxy - 13β - propylgona - 1,3,5(10),6,8,14 - hexaen-17-one, M.P. 110–120° C., $\lambda_{max.}^{EtOH}$ 254 mμ (ϵ=49,800), 263 (50,950), 296 (16,500), 307 (14,800), 334 (3,130), 347 (2,850)

Example VII

The above prepared 3-methoxy-13β-propylgona-1,3,5 (10),6,8,14-hexaen-17-one is hydrogenated in the presence of palladized charcoal in ethyl acetate to obtain 3-methoxy - 13β - propylgona - 1,3,5(10),6,8 - pentaen-17-one, M.P. 132–140° C. This pentaenone is then refluxed with acetic and hydrochloric acid, under helium for fifteen hours to yield 3-hydroxy-13β-propylgona-1,3,5(10), 6,8-pentaen-17-one, M.P. 234–237° C., $\lambda_{max.}^{EtOH}$ 233 mμ (ϵ=57,700), 273 (3,900), 283 (4,400), 294 (3,300), 334 (2,000), 342 (2,200)

Calculated for $C_{20}H_{22}O_2$: C, 81.60; H, 7.53. Found: C, 81.47; H, 7.25.

Example VIII

A mixture of 3-acetoxy-13β-methylgona-1,3,5(10),8, 14-pentaen-17-one (20 g.), powdered platinum black (1 g.), xylene (500 ml.) and acetylene dicarboxylic acid dimethyl ester (30 g.) is heated to reflux under nitrogen for one-half hour. After filtration and removal of volatile organics by vacuum distillation, the residue is crystallized from methanol. Recrystallization from acetone yields 3-acetoxy-13β-methylgona-1,3,5(10),6,8,14-hexaen-17-one.

Similarly, 13β - ethyl - 3 - propionyloxygona - 1,3,5 (10),8,14-pentaen-17-one is converted to 13β-ethyl-3-propionyloxygona-1,3,5(10),6,8,14-hexaen-17-one.

Example IX

A mixture of 3-butyryloxy-13β-methylgona-1,3,5(10), 8,14-pentaen-17-one (10 g.), 2% palladium on charcoal (25 g.), diethyleneglycol diethylether (300 ml.) and cinnamate (16.5 g.) is heated to reflux under helium for five hours. After filtration and removal of volatile organics by vacuum distillation, the residue is crystallized from ethanol. Recrystallization from ethanol yields 3-butyryloxy - 13β - methylgona - 1,3,5(10),6,8,14-hexaen-17-one.

The above prepared 3-butyryloxy-13β-methylgona-1,3,5(10),6,8,14-hexaen-17-one is hydrogenated in the presence of 10% palladium charcoal in ethyl acetate to yield 3 - butyryloxy - 13β - methylgona - 1,3,5(10),6,8-pentaen-17-one which is then refluxed with acetic and hydrochloric acid, under nitrogen, for fifteen hours, to yield 3-hydroxy-13β-methylgona-1,3,5(10),6,8-pentaen-17-one.

Example X

A mixture of 13β-methyl-3-methoxygona-1,3,5(10),8,14-pentaen-17β-ol (5 g.), 5% palladium on charcoal (5 g.), p-isopropyl-toluene (150 ml.) and methyl cinnamate (3.5 g.) is refluxed for one hour in an atmosphere of nitrogen. The catalyst is filtered off and the filtrate is evaporated to afford 13β-methyl-3-methoxygona-1,3,5(10),6,8,14-hexaen-17β-ol.

The above prepared 13β-ethyl-3-methoxygona-1,3,5(10),6,8,14-hexaen-17β-ol (1.0 g.) in ethanol (30 ml.) is shaken with 5% palladium on charcoal (1.0 g.) in an atmosphere of hydrogen until uptake ceases. The catalyst is filtered off and the filtrate evaporated to obtain 13β-methyl-3-methoxygona-1,3,5(10),6,8-pentaen-17β-ol. This alcohol (0.5 g.) is refluxed with aluminum isopropoxide (0.4 g.) in dry toluene (25 ml.) and dry cyclohexanone (5 cc.) in an atmosphere of nitrogen for two hours. The cooled solution is decomposed with water (1.0 cc) and dried by adding sodium sulfate. The mixture is filtered and the filtrate evaporated to leave a residue which is crystallized from ethanol to afford 13b-methyl-3-methoxygona-1,3,5(10),6,8-pentaen-17-one.

Example XI

A mixture of 13β-methyl-3,17β-dimethoxygona-1,3,5(10),8,14-pentaene (5.0 g.), 5% palladium on charcoal (5.0 g.), p-isopropyl-toluene (100 ml.) and methyl cinnamate (8 g.) is refluxed under nitrogen for two hours. The catalyst is filtered off and the filtrate evaporated to obtain 13β - methyl - 3,17β - dimethoxygona - 1,3,5(10),6,8,14-hexaene.

Hydrogenation of the above prepared 13β-methyl-3,17β-dimethoxygona-1,3,5(10),6,8,14-hexaene (1.0 g.) is carried out using 5% palladium on charcoal (1.0 g.) in ethyl acetate (50 ml.) to yield 13β-methyl-3,17β-dimethoxygona-1,3,5(10),6,8-pentaene. This pentaene (0.5 g.) is heated with 3 N methyl magnesium iodide in ether (15 ml.) at 100° C. to evaporate the solvent and then fused at 165° C. in an atmosphere of nitrogen for two hours. The mixture is cooled to −80° C. and decomposed by adding ethyl acetate followed by saturated aqueous ammonium chloride. The mixture is acidified with dilute hydrochloric acid and extracted with chloroform. The organic extract is washed with brine and evaporated to yield 13β-methylgona-1,3,5(10),6,8-pentaene-3,17β-diol.

Example XII

A mixture of 17β-acetoxy-13β-ethyl-3-methoxygona-1,3,5(10),8,14-pentaene (10 g.), 5% palladium on charcoal (10 g.), p-isopropyl-toluene (250 ml.) and methyl cinnamate (7 g.) is refluxed for one hour in an atmosphere of nitrogen. The catalyst is filtered off and the filtrate evaporated to give 17β-acetoxy-13β-ethyl-3-methoxygona-1,3,5(10),6,8,14-hexaene.

The above prepared 17β-acetoxy-13β-ethyl-3-methoxygona-1,3,5(10),6,8,14-hexaene (2.0 g.) is hydrogenated in ethyl acetate (100 ml.) with 5% palladium on charcoal (2.0 g.) to give 17β-acetoxy-13β-ethyl-3-methoxygona-1,3,5(10),6,8-pentaene.

Example XIII

A mixture of 13β-methyl-17,17-ethylenedioxy-3-methoxygona-1,3,5(10),8,14-pentaene (10 g.), 5% palladium on charcoal (10 g.), p-isopropyl-toluene (250 ml.) and methyl cinnamate (7.0 g.) is refluxed for one hour in an atmosphere of nitrogen. The catalyst is filtered off and the filtrate is evaporated. The residue is recrystallized from ethanol to give 13β-methyl-17,17-ethylenedioxy-3-methoxygona-1,3,5(10),6,8,14-hexaene.

The above prepared 13β-methyl-17,17-ethylenedioxy-3-methoxygona-1,3,5(10),6,8,14-hexaene (2 g.) is shaken in an atmosphere of hydrogen with 10% palladium on charcoal (2 g.) in ethyl acetate (50 ml.) until uptake ceases. The catalyst is filtered off and the filtrate is evaporated to give 13β-methyl-17,17-ethylenedioxy-3-methoxygona-1,3,5(10),6,8-pentaene. Treatment of the material (1 g.) in tetrahydrofuran (5 cc.), ethanol (5 cc.) and 6 N hydrochloric acid (3 cc.), on conventional work-up, yields 13β-methyl-3-methoxygona-1,3,5(10),6,8-pentaen-17-one.

Example XIV

A mixture of 13β-ethyl-17,17-ethylenedioxy-3-methoxygona-1,3,5(10),8,14-pentaene (10 g.), 5% palladium on charcoal (10 g.), p-isopropyl-toluene (250 ml.) and methyl cinnamate (7.0 g.) is refluxed under nitrogen for two hours. The catalyst is filtered off and the filtrate evaporated. The residue is crystallized from ethanol to afford 13β-ethyl-17,17-ethylenedioxy-3-methoxygona-1,3,5(10),6,8,14-hexaene.

The above prepared 13β-ethyl-17,17-ethylenedioxy-3-methoxygona-1,3,5(10),6,8,14-hexaene (1.0 g.) in tetrahydrofuran (10 ml.) and ethanol (10 ml.) is treated with 6 N hydrochloric acid (4 ml.) and the mixture allowed to stand for two hours. Ether is added and the solution washed, dried and evaporated. The residue is crystallized from acetone to afford 13β-ethyl-3-methoxygona-1,3,5(10),6,8,14-hexaen-17-one, which is converted to 13β-ethyl-3-hydroxygona-1,3,5(10),6,8-pentaen-17-one as described in Example X.

Example XV

Repeating the procedure of the previous examples, the hereinafter listed pentaenes are converted to their corresponding hexaenes:

| Pentaenes | Hexaenes |
| --- | --- |
| 17β-butyryloxy-3-methoxy-13β-methylgona-1, 3, 5(10), 8, 14-pentaene. | 17β-butyryl-3-methoxy-13β-methylgona-1, 3, 5(10), 6, 8, 14-hexaene. |
| 17α-acetoxy-3-methoxy-13β-methylgona-1, 3, 5(10), 8,14-pentaene. | 17α-acetoxy-3-methoxy-13β-methylgona-1,3 5(10), 6, 8, 14-hexaene. |
| 3-ethoxy-13β-ethyl-17α-propionyloxygona-1, 3, 5 (10), 8,14-pentaene. | 3-ethoyx-13β-ethyl-17α-propionyloxygona-1, 3, 5 (10), 6, 8, 14-hexaene. |

What is claimed is:

1. A process for the production of a gona-1,3,5(10),6,8,14-hexaene which comprises contacting a gona-1,3,5(10),8,14-pentaene with an oxidizing catalyst selected from the group consisting of palladized charcoal and metallic platinum black in a reaction-inert solvent in the presence of a hydrogen acceptor at a temperature range of from about 100° C. to about 180° C. for a period of from about one-half hour to about twenty hours.

2. A process for the production of a compound selected from the group consisting of those having the formula:

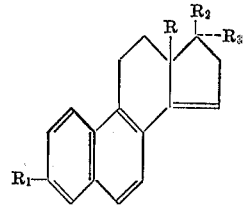

wherein R is lower alkyl and $R_1$ is selected from the group consisting of lower alkoxy and lower alkanoyloxy; and $R_2$ is selected from the group consisting of hydrogen, hydroxy, lower alkoxy, lower alkanoyloxy; $R_3$ is selected from the group consisting of hydrogen and lower alkanoyloxy with the proviso that one of $R_2$ and $R_3$ is hydrogen and that both $R_2$ and $R_3$ are not hydrogen; and when $R_2$ and $R_3$ are taken together they are selected from the group consisting of oxo and ethylenedioxy which comprises contacting a compound of the formula:

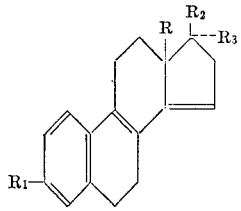

wherein R, $R_1$, $R_2$ and $R_3$ are defined as above, with an oxidizing catalyst selected from the group consisting of palladized charcoal and metallic platinum black in a reaction-inert solvent in the presence of a hydrogen acceptor at a temperature that is in the range of from about 100° C. to about 180° C. for a period of from about one-half hour to about twenty hours.

3. A process as described in claim 2 wherein the oxidizing catalyst consists of about five percent palladium on charcoal and the hydrogen acceptor is selected from the group consisting of methyl cinnamate, diethyl maleate, ethyl acrylate and acetylene dicarboxylic acid dimethyl ester.

4. A process as described in claim 2 wherein a gona-1,3,5(10),6,8,14-hexaen-17-one is produced by refluxing a gona-1,3,5(10),8,14-hexaen-17-one with palladized charcoal, in the presence of methyl cinnamate, in p-isopropyl-toluene for about one hour.

5. A process as described in claim 2 wherein 13β-ethyl-3-methoxygona-1,3,5(10),6,8,14-hexaen-17-one is produced by refluxing 13β-ethyl-3-methoxygona-1,3,5(10),8,14-pentaen-17-one with palladized charcoal, in the presence of methyl cinnamate, in p-isopropyl-toluene for about one hour.

References Cited

S. N. Ananchenko et al., Tetrahedron Letters No. 23, 1963, pp. 1553–1558.

LEWIS GOTTS, *Primary Examiner.*

E. G. LOVE, *Assistant Examiner.*